(12) United States Patent
Vozar et al.

(10) Patent No.: US 12,032,375 B2
(45) Date of Patent: Jul. 9, 2024

(54) MULTI-PERSPECTIVE SYSTEM AND METHOD FOR BEHAVIORAL POLICY SELECTION BY AN AUTONOMOUS AGENT

(71) Applicant: May Mobility, Inc., Ann Arbor, MI (US)

(72) Inventors: Steve Vozar, Ann Arbor, MI (US); Edwin Olson, Ann Arbor, MI (US); Tom Voorheis, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 0 days.

(21) Appl. No.: 17/588,809

(22) Filed: Jan. 31, 2022

(65) Prior Publication Data
US 2022/0155785 A1 May 19, 2022

Related U.S. Application Data

(63) Continuation of application No. 17/181,302, filed on Feb. 22, 2021, now Pat. No. 11,269,332, which is a
(Continued)

(51) Int. Cl.
*G05D 1/00* (2006.01)
*B60W 40/09* (2012.01)
(Continued)

(52) U.S. Cl.
CPC ........... *G05D 1/0088* (2013.01); *B60W 40/09* (2013.01); *G06V 20/56* (2022.01); *G07C 5/008* (2013.01); *H04W 4/46* (2018.02); *B60W 2556/45* (2020.02)

(58) Field of Classification Search
CPC ... B60W 2554/402; B60W 2554/4029; B60W 2554/4045; B60W 2556/10; G05D 1/0088;
(Continued)

(56) References Cited

U.S. PATENT DOCUMENTS

| 5,544,282 A | 8/1996 | Chen et al. |
| 6,199,013 B1 | 3/2001 | Oshea |

(Continued)

FOREIGN PATENT DOCUMENTS

| JP | 2011100492 A | 5/2011 |
| JP | 2015083417 A | 4/2015 |

(Continued)

OTHER PUBLICATIONS

Cunningham, A. , et al., "MPDM: Multipolicy Decision-Making in Dynamic, Uncertain Environments for Autonomous Driving", Proceedings of the IEEE International Conference on Robotics and Automation (ICRA) (2015).
(Continued)

*Primary Examiner* — Tyler J Lee
(74) *Attorney, Agent, or Firm* — Jeffrey Schox; Catlin Ploch (57) ABSTRACT

A system and a method for autonomous decisioning and operation by an autonomous agent includes: collecting decisioning data including: collecting a first stream of data includes observation data obtained by onboard sensors of the autonomous agent, wherein each of the onboard sensors is physically arranged on the autonomous agent; collecting a second stream of data includes observation data obtained by offboard infrastructure devices, the offboard infrastructure devices being arranged geographically remote from and in an operating environment of the autonomous agent; implementing a decisioning data buffer that includes the first stream of data from the onboard sensors and the second stream of data from the offboard sensors; generating current state data; generating/estimating intent data for each of one or more agents within the operating environment of the autonomous agent; identifying a plurality of candidate
(Continued)

behavioral policies; and selecting and executing at least one of the plurality of candidate behavioral policies.

18 Claims, 5 Drawing Sheets

Related U.S. Application Data continuation of application No. 16/743,289, filed on Jan. 15, 2020, now Pat. No. 10,962,975, which is a continuation of application No. 16/705,503, filed on Dec. 6, 2019, now Pat. No. 10,962,974, which is a continuation of application No. 16/514,624, filed on Jul. 17, 2019, now Pat. No. 10,564,641.

(60) Provisional application No. 62/701,014, filed on Jul. 20, 2018.

(51) Int. Cl.
 *G06V 20/56* (2022.01)
 *G07C 5/00* (2006.01)
 *H04W 4/46* (2018.01)

(58) Field of Classification Search
 CPC ........... G05D 2201/0213; G06V 20/56; G07C 5/008; G08G 1/0112; G08G 1/0116; G08G 1/0133; G08G 1/0145; G08G 1/162; H04W 4/024; H04W 4/029; H04W 4/38; H04W 4/40; H04W 4/46
 See application file for complete search history.

(56) References Cited

U.S. PATENT DOCUMENTS

| | | |
|---|---|---|
| 9,129,519 B2 | 9/2015 | Aoude et al. |
| 9,274,525 B1 | 3/2016 | Ferguson et al. |
| 9,368,026 B1 | 6/2016 | Herbach et al. |
| 9,495,874 B1 | 11/2016 | Zhu et al. |
| 9,507,346 B1 | 11/2016 | Levinson et al. |
| 9,618,938 B2 | 4/2017 | Olson et al. |
| 9,646,428 B1 | 5/2017 | Konrardy et al. |
| 9,720,412 B1 | 8/2017 | Zhu et al. |
| 9,811,760 B2 | 11/2017 | Richardson et al. |
| 9,914,452 B1 | 3/2018 | Ferguson et al. |
| 10,012,981 B2 | 7/2018 | Gariepy et al. |
| 10,062,294 B2* | 8/2018 | Kunzi ................... G01S 13/86 |
| 10,156,848 B1 | 12/2018 | Konrardy et al. |
| 10,235,882 B1 | 3/2019 | Aoude et al. |
| 10,248,120 B1 | 4/2019 | Siegel et al. |
| 10,386,856 B2 | 8/2019 | Wood et al. |
| 10,467,891 B1* | 11/2019 | Bart ..................... B64C 39/024 |
| 10,518,770 B2 | 12/2019 | Kroop et al. |
| 10,518,783 B2 | 12/2019 | Tanimichi et al. |
| 10,540,892 B1 | 1/2020 | Fields et al. |
| 10,558,224 B1 | 2/2020 | Lin et al. |
| 10,564,641 B2 | 2/2020 | Vozar et al. |
| 10,564,643 B2 | 2/2020 | Lui et al. |
| 10,571,916 B2 | 2/2020 | Tschanz et al. |
| 10,586,254 B2 | 3/2020 | Singhal |
| 10,599,155 B1 | 3/2020 | Konrardy et al. |
| 10,614,709 B2 | 4/2020 | Vozar et al. |
| 10,642,276 B2 | 5/2020 | Huai |
| 10,654,476 B2 | 5/2020 | Wray et al. |
| 10,671,076 B1 | 6/2020 | Kobilarov et al. |
| 10,717,445 B2 | 7/2020 | Michalakis et al. |
| 10,761,542 B1 | 9/2020 | Fairfield et al. |
| 10,796,581 B2 | 10/2020 | Herbach et al. |
| 10,860,019 B2 | 12/2020 | Censi et al. |
| 10,969,470 B2 | 4/2021 | Voorheis et al. |
| 11,003,916 B2 | 5/2021 | Hummelshøj |
| 11,086,318 B1 | 8/2021 | Davis et al. |
| 11,215,982 B2 | 1/2022 | Urano et al. |
| 11,242,054 B2 | 2/2022 | Isele |
| 11,260,855 B2 | 3/2022 | Zhang |
| 11,269,332 B2 | 3/2022 | Vozar et al. |
| 11,281,213 B2* | 3/2022 | Cross ................... G05D 1/0061 |
| 11,300,957 B2 | 4/2022 | Wray et al. |
| 11,352,023 B2 | 6/2022 | Fairley et al. |
| 11,380,108 B1 | 7/2022 | Cai et al. |
| 11,396,302 B2 | 7/2022 | Ye et al. |
| 11,472,436 B1 | 10/2022 | Patel et al. |
| 11,472,444 B2 | 10/2022 | Goeddel et al. |
| 11,525,887 B2 | 12/2022 | Voorheis et al. |
| 11,554,793 B2 | 1/2023 | Han et al. |
| 11,565,717 B2 | 1/2023 | Kothbauer et al. |
| 11,748,085 B2 | 9/2023 | Fields et al. |
| 11,780,466 B1 | 10/2023 | Shah |
| 2002/0062207 A1 | 5/2002 | Faghri |
| 2004/0100563 A1 | 5/2004 | Sablak et al. |
| 2005/0004723 A1 | 1/2005 | Duggan et al. |
| 2006/0184275 A1 | 8/2006 | Hosokawa et al. |
| 2006/0200333 A1 | 9/2006 | Dalal et al. |
| 2007/0193798 A1 | 8/2007 | Allard et al. |
| 2007/0276600 A1 | 11/2007 | King et al. |
| 2008/0033684 A1 | 2/2008 | Vian et al. |
| 2010/0114554 A1 | 5/2010 | Misra |
| 2011/0142283 A1 | 6/2011 | Huang et al. |
| 2012/0089275 A1 | 4/2012 | Yao-Chang et al. |
| 2013/0054106 A1 | 2/2013 | Schmuedderich et al. |
| 2013/0141576 A1 | 6/2013 | Lord et al. |
| 2013/0253816 A1 | 9/2013 | Caminiti et al. |
| 2014/0195138 A1 | 7/2014 | Stelzig et al. |
| 2014/0244198 A1 | 8/2014 | Mayer |
| 2014/0309815 A1 | 10/2014 | Ricci et al. |
| 2015/0105961 A1* | 4/2015 | Callow ................... G05D 1/021 |
| | | 701/23 |
| 2015/0284010 A1 | 10/2015 | Beardsley et al. |
| 2015/0302756 A1 | 10/2015 | Guehring et al. |
| 2015/0316928 A1 | 11/2015 | Guehring et al. |
| 2015/0321337 A1 | 11/2015 | Stephens |
| 2015/0344030 A1 | 12/2015 | Damerow et al. |
| 2016/0005333 A1 | 1/2016 | Naouri |
| 2016/0209840 A1 | 7/2016 | Kim |
| 2016/0314224 A1 | 10/2016 | Wei et al. |
| 2016/0334230 A1 | 11/2016 | Ross et al. |
| 2017/0031361 A1 | 2/2017 | Olson et al. |
| 2017/0032671 A1 | 2/2017 | Toyama et al. |
| 2017/0072853 A1 | 3/2017 | Matsuoka et al. |
| 2017/0123419 A1 | 5/2017 | Levinson et al. |
| 2017/0155696 A1 | 6/2017 | Dong et al. |
| 2017/0192426 A1 | 7/2017 | Rust |
| 2017/0199523 A1 | 7/2017 | Barton-Sweeney et al. |
| 2017/0268896 A1 | 9/2017 | Bai et al. |
| 2017/0289341 A1 | 10/2017 | Rodriguez et al. |
| 2017/0291560 A1 | 10/2017 | Schroeder et al. |
| 2017/0301111 A1 | 10/2017 | Zhao et al. |
| 2017/0320500 A1 | 11/2017 | Yoo et al. |
| 2017/0323568 A1 | 11/2017 | Inoue et al. |
| 2017/0356748 A1 | 12/2017 | Jagnemma |
| 2018/0011485 A1 | 1/2018 | Ferren |
| 2018/0046182 A1 | 2/2018 | Joyce et al. |
| 2018/0047291 A1 | 2/2018 | Konishi et al. |
| 2018/0053102 A1 | 2/2018 | Martinson et al. |
| 2018/0065625 A1 | 3/2018 | Tijerina et al. |
| 2018/0070056 A1 | 3/2018 | Deangelis et al. |
| 2018/0082596 A1 | 3/2018 | Whitlow |
| 2018/0089563 A1 | 3/2018 | Redding et al. |
| 2018/0100743 A1 | 4/2018 | Diaz et al. |
| 2018/0183873 A1 | 6/2018 | Wang et al. |
| 2018/0184352 A1 | 6/2018 | Lopes et al. |
| 2018/0196427 A1* | 7/2018 | Majumdar ............ B60W 40/09 |
| 2018/0220283 A1 | 8/2018 | Condeixa et al. |
| 2018/0224851 A1 | 8/2018 | Park |
| 2018/0251126 A1 | 9/2018 | Linscott et al. |
| 2018/0267550 A1 | 9/2018 | Kopetz et al. |
| 2018/0268281 A1 | 9/2018 | Olson et al. |
| 2018/0293537 A1 | 10/2018 | Kwok |
| 2018/0299898 A1 | 10/2018 | Luo et al. |
| 2018/0330481 A1 | 11/2018 | Watanabe et al. |
| 2018/0365908 A1 | 12/2018 | Liu et al. |
| 2018/0367997 A1 | 12/2018 | Shaw et al. |
| 2019/0025819 A1 | 1/2019 | Ferguson et al. |

(56) References Cited

U.S. PATENT DOCUMENTS

| | | |
|---|---|---|
| 2019/0027034 A1 | 1/2019 | Xu et al. |
| 2019/0039545 A1 | 2/2019 | Kumar et al. |
| 2019/0042859 A1 | 2/2019 | Schubert et al. |
| 2019/0066399 A1 | 2/2019 | Jiang et al. |
| 2019/0096244 A1 | 3/2019 | Guruva Reddiar et al. |
| 2019/0101914 A1 | 4/2019 | Coleman et al. |
| 2019/0101919 A1 | 4/2019 | Kobilarov et al. |
| 2019/0106117 A1 | 4/2019 | Goldberg |
| 2019/0113919 A1 | 4/2019 | Englard et al. |
| 2019/0113929 A1 | 4/2019 | Mukadam et al. |
| 2019/0130878 A1* | 5/2019 | Bradley ............... B60W 50/14 |
| 2019/0138524 A1 | 5/2019 | Singh et al. |
| 2019/0147610 A1 | 5/2019 | Frossard et al. |
| 2019/0163176 A1 | 5/2019 | Wang et al. |
| 2019/0180529 A1 | 6/2019 | Smith |
| 2019/0188493 A1 | 6/2019 | Tiziani |
| 2019/0196465 A1 | 6/2019 | Hummelshøj |
| 2019/0220011 A1 | 7/2019 | Della Penna |
| 2019/0227553 A1 | 7/2019 | Kentley-Klay et al. |
| 2019/0235516 A1 | 8/2019 | Zhang et al. |
| 2019/0236950 A1 | 8/2019 | Li et al. |
| 2019/0258246 A1 | 8/2019 | Liu et al. |
| 2019/0258251 A1 | 8/2019 | Ditty et al. |
| 2019/0265059 A1 | 8/2019 | Warnick et al. |
| 2019/0271981 A1 | 9/2019 | Oba |
| 2019/0329771 A1 | 10/2019 | Wray et al. |
| 2019/0331758 A1 | 10/2019 | Malkes et al. |
| 2019/0332106 A1 | 10/2019 | Belloni Mourao et al. |
| 2019/0337509 A1 | 11/2019 | Shalev-Shwartz et al. |
| 2020/0004241 A1 | 1/2020 | Levinson et al. |
| 2020/0017114 A1 | 1/2020 | Santoni et al. |
| 2020/0020226 A1 | 1/2020 | Stenneth et al. |
| 2020/0026286 A1 | 1/2020 | Vozar et al. |
| 2020/0057441 A1 | 2/2020 | Wang et al. |
| 2020/0086837 A1 | 3/2020 | Le Cornec |
| 2020/0094850 A1 | 3/2020 | Chi et al. |
| 2020/0097003 A1 | 3/2020 | Wray et al. |
| 2020/0098269 A1 | 3/2020 | Wray et al. |
| 2020/0110411 A1 | 4/2020 | Vozar et al. |
| 2020/0122830 A1 | 4/2020 | Anderson et al. |
| 2020/0124447 A1 | 4/2020 | Schwindt et al. |
| 2020/0150661 A1 | 5/2020 | Vozar et al. |
| 2020/0159227 A1 | 5/2020 | Cohen et al. |
| 2020/0189731 A1 | 6/2020 | Mistry et al. |
| 2020/0209846 A1 | 7/2020 | Chen |
| 2020/0209853 A1 | 7/2020 | Leach et al. |
| 2020/0209864 A1 | 7/2020 | Chen |
| 2020/0210777 A1 | 7/2020 | Valois et al. |
| 2020/0217668 A1 | 7/2020 | Cionca et al. |
| 2020/0233060 A1 | 7/2020 | Lull et al. |
| 2020/0249684 A1 | 8/2020 | Onofrio et al. |
| 2020/0255027 A1 | 8/2020 | Kulkarni et al. |
| 2020/0269843 A1 | 8/2020 | Wissing et al. |
| 2020/0290619 A1 | 9/2020 | Mehdi et al. |
| 2020/0293038 A1 | 9/2020 | Laurent et al. |
| 2020/0293041 A1 | 9/2020 | Palanisamy |
| 2020/0294401 A1 | 9/2020 | Kerecsen |
| 2020/0309543 A1 | 10/2020 | Voznesensky |
| 2020/0310417 A1 | 10/2020 | Pedersen et al. |
| 2020/0339151 A1 | 10/2020 | Batts et al. |
| 2020/0346666 A1 | 11/2020 | Wray et al. |
| 2020/0355820 A1 | 11/2020 | Zeng et al. |
| 2020/0369294 A1 | 11/2020 | Jeon et al. |
| 2020/0379457 A1 | 12/2020 | Ostafew et al. |
| 2020/0388159 A1 | 12/2020 | Degerman |
| 2020/0400781 A1 | 12/2020 | Voorheis et al. |
| 2020/0401135 A1 | 12/2020 | Chen et al. |
| 2021/0018916 A1 | 1/2021 | Thakur et al. |
| 2021/0042535 A1 | 2/2021 | Abbott et al. |
| 2021/0116907 A1 | 4/2021 | Altman |
| 2021/0132606 A1 | 5/2021 | Basich et al. |
| 2021/0163021 A1 | 6/2021 | Frazzoli et al. |
| 2021/0181758 A1 | 6/2021 | Das et al. |
| 2021/0197864 A1 | 7/2021 | Oltmann et al. |
| 2021/0200207 A1 | 7/2021 | Soryal et al. |
| 2021/0208244 A1 | 7/2021 | Voorheis et al. |
| 2021/0229697 A1 | 7/2021 | Lee et al. |
| 2021/0237759 A1 | 8/2021 | Wray et al. |
| 2021/0245785 A1 | 8/2021 | Suzuki et al. |
| 2021/0269063 A1 | 9/2021 | Lee et al. |
| 2021/0286651 A1 | 9/2021 | Ho et al. |
| 2021/0323573 A1 | 10/2021 | Gogna |
| 2021/0339741 A1 | 11/2021 | Rezvan Behbahani et al. |
| 2021/0365701 A1 | 11/2021 | Eshet et al. |
| 2022/0063674 A1 | 3/2022 | De Francesco et al. |
| 2022/0066440 A1 | 3/2022 | Sucan et al. |
| 2022/0073097 A1 | 3/2022 | Sucan et al. |
| 2022/0076032 A1 | 3/2022 | Jain et al. |
| 2022/0081005 A1 | 3/2022 | Brown et al. |
| 2022/0126878 A1 | 4/2022 | Moustafa et al. |
| 2022/0144306 A1 | 5/2022 | Narang et al. |
| 2022/0169263 A1 | 6/2022 | Li et al. |
| 2022/0185325 A1 | 6/2022 | Chen et al. |
| 2022/0194419 A1 | 6/2022 | Houshmand et al. |
| 2022/0204010 A1 | 6/2022 | Zhu et al. |
| 2022/0227389 A1 | 7/2022 | Tam |
| 2022/0230080 A1 | 7/2022 | Sele et al. |
| 2022/0348222 A1 | 11/2022 | Zhao et al. |
| 2022/0348223 A1 | 11/2022 | Zhao et al. |
| 2023/0067887 A1 | 3/2023 | Garg et al. |
| 2023/0166764 A1 | 6/2023 | Johnson et al. |
| 2023/0174103 A1 | 6/2023 | Patel et al. |
| 2023/0176573 A1 | 6/2023 | Kumavat et al. |
| 2023/0192134 A1 | 6/2023 | Winter et al. |
| 2023/0194286 A1 | 6/2023 | Winter et al. |
| 2023/0256991 A1 | 8/2023 | Johnson et al. |

FOREIGN PATENT DOCUMENTS

| | | |
|---|---|---|
| JP | 2016091039 A | 5/2016 |
| JP | 2016184276 A | 10/2016 |
| WO | 2015160900 A1 | 10/2015 |

OTHER PUBLICATIONS

Mehta, D., et al., "Autonomous Navigation in Dynamic Social Environments Using Multi-Policy Decision Making", Proceedings of the IEEE/RSJ International Conference on Intelligent Robots and Systems (IROS) (2016).

Mehta, D., et al., "Fast Discovery of Influential Outcomes for Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B., et al., "A Survey of Motion Planning and Control Techniques for Self-driving Urban Vehicles", IEEE Transactions on Intelligent Vehicles, vol. 1, Ids. 1, (Jun. 13, 2016).

Straub, J., "Comparing The Effect of Pruning on a Best Path and a Naive-approach Blackboard Solver", International Journal of Automation and Computing (Oct. 2015).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

Crossman, Jacob, et al., "Method and System for Assessing and Mitigating Risks Encounterable by an Autonomous Vehicle", U.S. Appl. No. 18/538,312, filed Dec. 13, 2023.

* cited by examiner

Collecting Decisioning Data S210

Building A Global Data Buffer S215

Processing Decisioning Data S220

Implementing Data Fusion S222

Generating Hypothesis Data S224

Identifying Agent Data S230

Delimiting Behavioral Policies S240

Selecting A Behavioral Policy S250

Executing A Selected Behavioral Policy S255

MULTI-PERSPECTIVE SYSTEM AND METHOD FOR BEHAVIORAL POLICY SELECTION BY AN AUTONOMOUS AGENT

CROSS-REFERENCE TO RELATED APPLICATIONS

This application is a continuation of U.S. patent application Ser. No. 17/181,302, filed 22 Feb. 2021, which is a continuation of U.S. patent application Ser. No. 16/743,289, filed 15 Jan. 2020, which is a continuation of U.S. patent application Ser. No. 16/705,503, filed 6 Dec. 2019, which is a continuation of U.S. patent application Ser. No. 16/514,624, filed 17 Jul. 2019, which claims the benefit of U.S. Provisional Application No. 62/701,014, filed 20 Jul. 2018, both of which are incorporated in their entireties by this reference.

TECHNICAL FIELD

The inventions relate generally to the vehicle automation field, and more specifically to new and useful systems and methods for selecting behavioral policy by an autonomous agent.

BACKGROUND

State of the art vehicle automation presently enables some vehicles, such as cars, to operate in a substantially and/or sometimes fully autonomous state. An ability of such autonomous agents to operate effectively and safely in busy or active environments often relies on an ability of the autonomous agent to observe its operating environment and make operating decisions that enables the autonomous agent to achieve a routing or traveling goal in a safe manner.

A technical problem that may arise in many operating circumstances involving an autonomous agent may relate to an inability of the autonomous agent to select or make the most optimal operating decision when multiple operating decisions are possible in a given operating circumstance. While route planning and low-level control instructions may provide a basis for performing self-controls by an autonomous agent for achieving a particular destination, behavioral planning typically provides a basis for performing real-time decisions by the autonomous agent according to live observations of the operating environment made by one or more sensors onboard the autonomous agent. In particular, the autonomous agent's perspective of its real-time environment for selecting behavioral policy is primarily shaped by onboard sensors carried by the autonomous agent. Thus, the technical problem persists because the autonomous agent may have only a singular view of its operating environment rather than comprehensive perspectives of the operating environment to enable an optimal selection of behavioral policy in real-time operating circumstances.

Thus, there is a need in the vehicle automation field for enabling a multi-perspective view of an operating environment of an autonomous agent that enables an optimal selection of behavioral policy by an autonomous agent in real-time operating conditions. The embodiments of the present application described herein provide technical solutions that address, at least, the need described above.

BRIEF DESCRIPTION OF THE INVENTION(S)

In one embodiment, a system for intelligently implementing an autonomous agent includes: a plurality of offboard infrastructure devices arranged geographically remote an autonomous agent and that: collect observation data relating to circumstances surrounding a travel route of the autonomous agent; the autonomous agent comprising: a communication interface that enables the autonomous agent to communicate with each of the plurality of offboard infrastructure devices; an onboard sensor suite comprising a plurality of distinct sensors arranged on the autonomous agent and that collect observation data relating to circumstances surrounding the autonomous agent from a perspective that is distinct a perspective of the plurality of offboard infrastructure devices; a decisioning data buffer storing at least a first stream of observation data from the onboard sensor suite and a second stream of observation data from the plurality of offboard infrastructure devices; one or more onboard computing devices that: implements a tracking of one or more agents within the circumstances surrounding the autonomous agent based on the first stream of data and the second stream of data; computes an intent estimation for each of the one or more agents based on the first stream of data and the second stream of data; computes state data for each of the one or more agents and for the autonomous agent; implements a multi-policy decision-making module that identifies a plurality of candidate behavioral policies for the autonomous agent based on the tracking and the intent estimation; selects one of the plurality of candidate behavioral policies and executes the selected one of the plurality of candidate behavioral policies for controlling an autonomous operation of the autonomous agent.

In one embodiment, the one or more onboard computing devices further implement: a time synchronization module that synchronizes the first stream of observation data and the second stream of observation data to the autonomous agent by synchronizing: the first stream of observation data to the autonomous agent based on a first computed communication latency between the onboard sensor suite and the autonomous agent; the second stream of observation data to the autonomous agent based on a second computed communication latency between the plurality of offboard infrastructure devices and the autonomous agent.

In one embodiment, the one or more onboard computing devices further: rearrange a position of the first stream of observation data from a first position to a second position within the decisioning data buffer based on the synchronization; and rearrange a position of the second stream of observation data from a first position to a second position within the decisioning data buffer based on the synchronization.

In one embodiment, the one or more onboard computing devices further implement: a synchronization module that synchronizes the first stream of observation data of the autonomous agent and the second stream of observation data from offboard infrastructure devices according to a common clock of the autonomous agent.

In one embodiment, the one or more onboard computing devices: in response to the synchronization of the first stream of observation data and the second stream of observation data, data from the first stream of observation data and data from the second stream of observation data are repositioned to a historical position within the decisioning data buffer that is associated with an earlier point in time relative to data that is positioned beyond the data from the first stream and the second stream of observation data.

In one embodiment, the one or more onboard computing devices: stores data obtained from each of the plurality of offboard infrastructure devices and data obtained from each of the plurality of distinct sensors of the onboard sensor suite within a distinct track of memory that is independent from other tracks of memory, wherein an intent estimation for any agents identified within the data obtained from each of the plurality of offboard infrastructure devices and the data obtained from each of the plurality of distinct sensors is computed based on the distinct track of memory for the respective offboard infrastructure device or the respective distinct sensor.

In one embodiment, the distinct track of memory for the data obtained from each of the plurality of offboard infrastructure devices and the data obtained from each of the plurality of distinct sensors is combined into a master track of memory; the intent estimation for each of the one or more agents is based on the master track of memory.

In one embodiment, the system may include a remote autonomous agent service being implemented by a distributed network of computing devices and that is in operable communication with each of the autonomous agent and each of the plurality of offboard infrastructure devices, wherein the remote autonomous agent service computes one or more: the tracking of one or more agents within the circumstances surrounding the autonomous agent based on the first stream of data and the second stream of data; the intent estimation for each of the one or more agents based on the first stream of data and the second stream of data.

In one embodiment, a method for autonomous decisioning and operation by an autonomous agent includes: collecting decisioning data including: collecting a first stream of data comprising observation data obtained by one or more onboard sensors of the autonomous agent, wherein each of the one or more onboard sensors is physically arranged on the autonomous agent; collecting a second stream of data comprising observation data obtained by one or more offboard infrastructure devices, the one or more offboard infrastructure devices being arranged geographically remote from and in an operating environment of the autonomous agent; implementing a decisioning data buffer that includes the first stream of data from the one or more onboard sensors and the second stream of data from the offboard sensors; generating current state data; generating/estimating intent data for each of one or more agents within the operating environment of the autonomous agent; identifying a plurality of candidate behavioral policies; and selecting and executing at least one of the plurality of candidate behavioral policies.

In one embodiment, the operating environment of the autonomous agent including a predetermined radius from a geographical position of the autonomous agent while operating along a structured or an unstructured route of the autonomous agent.

In one embodiment, the first stream of data includes data relating to sensed observations of circumstances surrounding the autonomous agent obtained from a perspective of the autonomous agent by each of the one or more onboard sensors; the second stream of data includes data relating to sensed observations of circumstances within the operating environment of the autonomous agent obtained from an external perspective toward a route of the autonomous agent that is made by each of the offboard infrastructure devices.

In one embodiment, the second stream of data includes data relating to an operating state of at least one of the one or more offboard infrastructure devices.

In one embodiment, in response to traveling into a communication proximity of at least one of the one or more offboard infrastructure devices, automatically collecting the second stream of data from the at least one or more offboard infrastructure devices within the communication proximity.

In one embodiment, a field-of-sensing of the one or more offboard infrastructure devices comprises a geometrically defined region, the one or more offboard infrastructure devices may be configured to sense or collect semantic abstractions of objects within the geometrically defined region.

In one embodiment, the second stream of data from the offboard infrastructure devices includes semantically dense state data of a scene.

In one embodiment, implementing the decisioning data buffer includes: sequentially storing data received from the first stream of data and the second stream of data based on a time at which each of the first stream of data and the second stream of data was received.

In one embodiment, implementing the decisioning data buffer further includes: computing a global time synchronization between the first stream of data and the second stream of data based on timestamp data appended with the second stream of data provided by the one or more offboard infrastructure device, wherein computing the global time synchronization includes computing a latency value for the second stream of data based on calculating a difference between a first timestamp data indicating a first time at which the second stream of data was obtained by the one or more offboard infrastructure devices and a second timestamp data indicating a second time at which the second stream of data was collected by the autonomous agent.

In one embodiment, implementing the decisioning data buffer includes: repositioning within the decisioning data buffer data from the second data stream based on the computed latency value, wherein the repositioning includes moving the data from the second data stream from a first position to a second position within the decisioning data buffer that is earlier in historical time.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. Overview

As discussed in the background section, an ability of an autonomous agent to select optimal behavioral policy for navigating real-time operating circumstances is lacking due to a limited comprehension of an operating environment of the autonomous agent. Specifically, modern autonomous agents may use only a single perspective (i.e., the autonomous agent's perspective) for behavioral policy decisioning and fail to take into account perspectives outside of their own that may enhance a quality of behavioral policy selection. The technical issue of suboptimal behavioral policy selection by an autonomous agent may be significantly compounded due to exponential behavioral policy options that may populate when an operating environment of the autonomous agent includes many active or dynamic agents with many possible intents. Thus, the many possible intents of active agents in an operating environment may result in seemingly intractable variations of behavioral policies.

A technical solution proposed herein that makes tractable a set of possible behavioral policy options available for execution by an autonomous agent includes augmenting onboard perceptual data generated by the autonomous agent with offboard perceptual data obtained from offboard data sources.

The embodiments of the present application provide enhanced systems and methods that enable improved behavioral policy selection using a multi-perspective approach for an enhanced comprehension of an operating environment by an autonomous agent. That is, one or more embodiments of the present application, enable an autonomous agent to assimilate data and/or perspectives from multiple actors outside of or external to the autonomous agent. Accordingly, the autonomous agent may be able to use as input data for decisioning or selecting a behavioral policy data that would otherwise be unavailable or imperceptible to the autonomous vehicle based on the limited field-of-detection of its onboard sensors.

Accordingly, one or more embodiments of the present application provide sensing devices that are external (e.g., offboard sensing devices, infrastructure sensing devices, or the like) to the autonomous agent and that may be arranged in an operating environment of the autonomous agent for collecting data from various perspectives within the operating environment that may be distinct from the one or more perspectives of the onboard sensor suite of the autonomous agent. In such embodiments, these offboard sensing devices may function to provide one or more streams of sensed data to the autonomous agent that may be used as additional decisioning input data for selecting behavioral policy by the autonomous agent. That is, the one or more embodiments of the present application augment onboard sensing data of the autonomous agent with offboard sensing data to enable a multi-perspective comprehension of an operating environment of the autonomous agent ahead of making a selection of a behavioral policy in a real-time or near real-time operating circumstance.

2. System for Autonomous Decisioning Using Infrastructure Sensing Data

Figure 1:
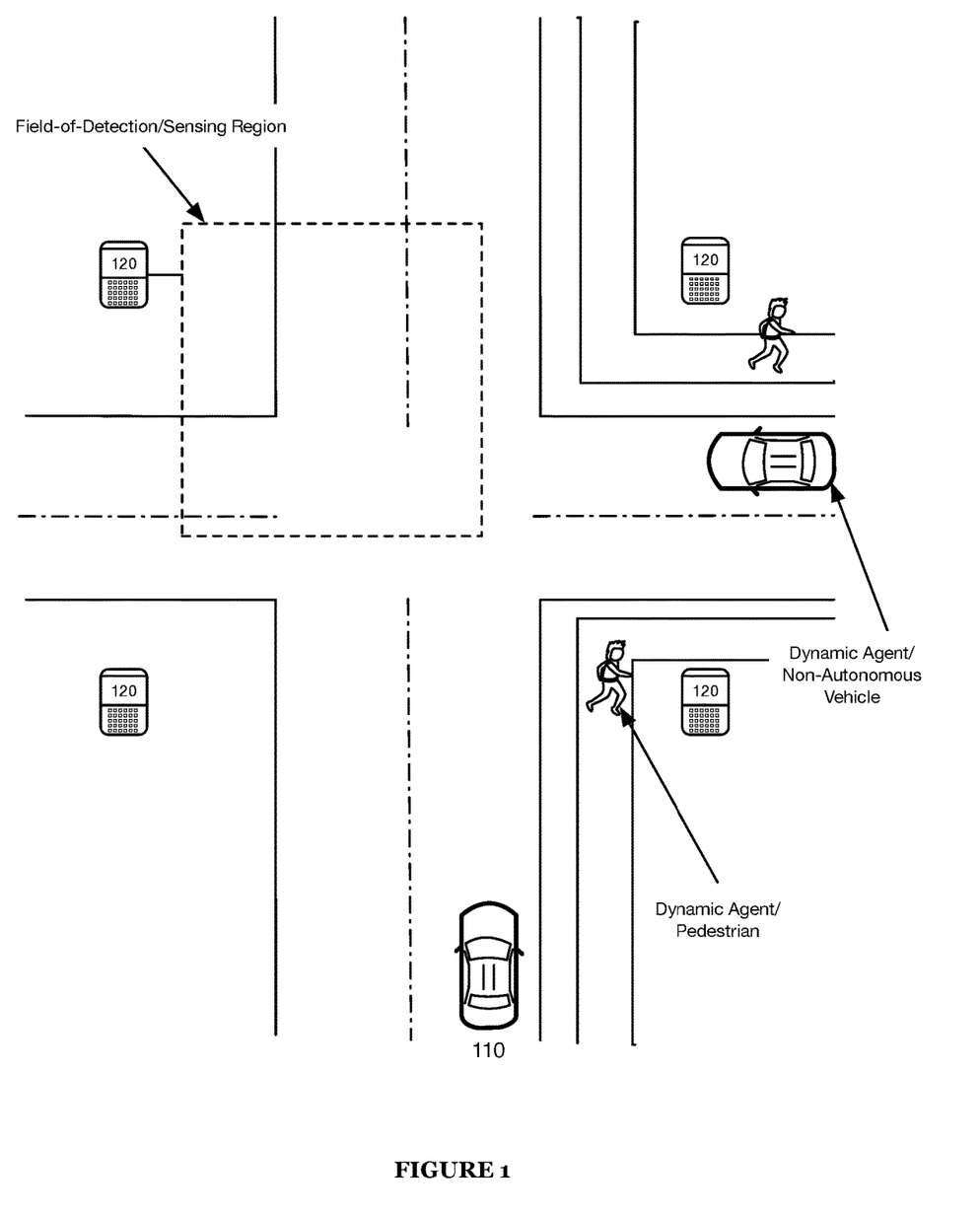
FIG. 1 illustrates a schematic representation of a system for implementing an autonomous agent in accordance with one or more embodiments of the present application.
Figure 1A:
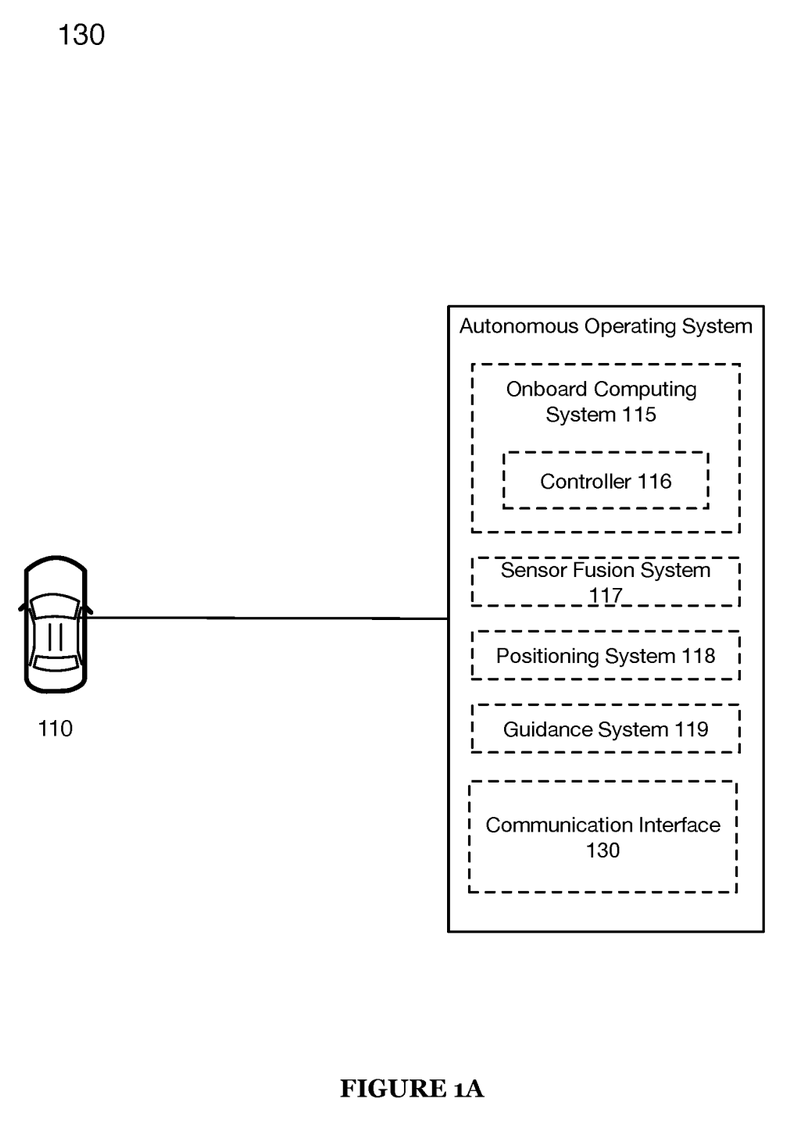
FIG. 1A illustrates an example schematic representation of an autonomous agent operating system in accordance with one or more embodiments of the present application.

As shown in FIGS. 1-1A, a system 100 that enables multi-policy decisioning by an autonomous agent includes an autonomous agent no, an onboard computing system 115, a plurality of infrastructure devices 120, and a communication interface 130.

The autonomous agent 110 preferably includes an autonomous vehicle 110 that is preferably a fully autonomous vehicle, but may additionally or alternatively be any semi-autonomous or fully autonomous vehicle; e.g., a boat, an unmanned aerial vehicle, a driverless car, etc. Additionally, or alternatively, the autonomous agent 11o may be a vehicle that switches between a semi-autonomous state and a fully autonomous state (or a fully-manned state) and thus, the autonomous agent 110 may have attributes of both a semi-autonomous vehicle and a fully autonomous vehicle depending on the state of the autonomous agent 110. While some portions of the embodiments of the present application are described herein as being implemented via an autonomous agent 110 (e.g., an autonomous vehicle (e.g., a driverless car), a semi-autonomous, an unmanned aerial vehicle (e.g., a drone), or the like) it shall be noted that any suitable computing device (e.g., any edge device including mobile computing devices, etc.) may be implemented to process sensor data of an autonomous agent 110. While it is generally described that the autonomous agent 110 may be an autonomous vehicle, it shall be noted that the autonomous agent no may be any type of kind of autonomous machine, autonomous device, autonomous robot, and/or the like.

In a preferred embodiment, the autonomous agent no includes an onboard computing system 115 (e.g., a computer integrated with the autonomous agent) or any suitable vehicle system but can additionally or alternatively be decoupled from the autonomous agent 110 (e.g., a user mobile device operating independent of the autonomous agent).

Additionally, or alternatively, the onboard computing 115 may include a processing system (e.g., graphical processing unit or GPU, central processing unit or CPU, or any suitable processing circuitry) as well as memory. The memory can be short term (e.g., volatile, non-volatile, random access memory or RAM, etc.) and/or long term (e.g., flash memory, hard disk, etc.) memory. As discussed below, the autonomous agent no may additionally include a communication interface 130 that includes a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, or any other suitable wired data communication system or protocol), sensors, and/or a data transfer bus (e.g., CAN, FlexRay). In a preferred embodiment, the onboard computing system 115 may operate to interact with and/or operably control any or one or more of the identified components or modules described herein. For instance, the onboard computing system 115 may function to implement and/or execute computer instructions for implementing a multi-policy decisioning module, a synchronization module, and/or the like.

Additionally, or alternatively, the autonomous agent no may be in operable communication with a remote or disparate computing system that may include a user device (e.g., a mobile phone, a laptop, etc.), a remote server, a cloud server, or any other suitable local and/or distributed computing system remote from the vehicle. The remote computing system may preferably be connected to one or more systems of the autonomous agent through one or more data connections (e.g., channels), but can alternatively communicate with the vehicle system in any suitable manner.

The onboard computing system 115 preferably functions to control the autonomous agent no and process sensed data from a sensor suite (e.g., a computer vision system, LIDAR, flash LIDAR, wheel speed sensors, GPS, etc.) of the autonomous agent no and/or other (infrastructure device 120) sensors to determine states of the autonomous agent no and/or states of agents in an operating environment of the autonomous agent no. Based upon the states of the autonomous agent and/or agents in the operating environment and programmed instructions, the onboard computing system 115 preferably modifies or controls behavior of autonomous agent 110. Additionally, or alternatively, the onboard computing system 115 preferably includes a multi-policy decision-making module 117 that functions to generate behavioral policies and select a behavioral policy that the onboard computing system 115 may function to execute to control a behavior of the autonomous agent 110.

The onboard computing system 115 is preferably a general-purpose computer adapted for I/O communication with vehicle control systems and sensor systems but may additionally or alternatively be any suitable computing device.

Additionally, or alternatively, the onboard computing system 115 is preferably connected to the Internet via a wireless connection (e.g., via a cellular link or connection). Additionally, or alternatively, the onboard computing system 115 may be coupled to any number of wireless or wired communication systems.

The infrastructure devices 120 preferably function to observe one or more aspects and/or features of an environment and collect observation data relating to the one or more aspects and/or features of the environment. In such preferred embodiments, the infrastructure devices additionally function to collect data associated with the observations and transmit the collected data and/or processed derivatives of the collected data to the autonomous agent 110. In some implementations, the infrastructure devices may additionally forward the collected observations data to an autonomous vehicle service and/or remote platform (e.g., implemented via a network of distributed computing systems or the like) that operates to interactively communicate with and/or control one or more functions of the autonomous agent 110.

In some embodiments, the infrastructure devices 120 may be referred to herein as roadside units. The roadside units preferably include devices in an immediate and/or close proximity or within short-range communication proximity to an operating position of an autonomous agent 110, such as an autonomous car, and may function to collect data regarding circumstances surrounding the autonomous agent 110 and in areas proximate to a zone of operation of the autonomous agent 110. In some embodiments, the roadside units may include one or more of offboard sensing devices including flash LIDAR, thermal imaging devices (thermal cameras), still or video capturing devices (e.g., image cameras and/or video cameras, etc.), global positioning systems, radar systems, microwave systems, inertial measuring units (IMUs), and/or the like.

The infrastructure devices 120 may additionally or alternatively include computing capabilities via processing circuitry and a communication interface that enables the infrastructure devices 120 to communicate with an autonomous agent 110. The zone of operation of the autonomous agent 110 may be defined as a predefined radius along a structured and/or unstructured route of the autonomous agent 110. For instance, in the case of a structured and/or predefined autonomous agent route, the proximate zone of operation of the autonomous agent may be one hundred feet (100 ft) from or along any point along the structured route. In such embodiments, the zone of operation may be defined as some radius or predefined distance (e.g., 100 ft) at any point along the structured route at which the autonomous agent 110 is positioned and/or operating (e.g., driving).

A technical benefit achieved by the implementation of the infrastructure devices 120 includes an ability to observe circumstances (e.g., around corners, down perpendicular streets, etc.) beyond the observable scope of the autonomous agent 110. That is, at a given instance in time observations of one or more aspects of a given environment may be made by an autonomous agent 110 and observations of one or more different and/or overlapping aspects of the given environment may be made from a different perspective by one or more infrastructure devices 120 arranged and operating in the given environment. In such embodiments, the perspective of the infrastructure devices 120, including the observation data therefrom, may be augmented to observation data from the perspective of the autonomous agent 110 to generate a comprehensive perspective of the operating environment of the autonomous agent 110. In this way, improved predictions of the operating environment may be made and consequently, improved behavioral policy decisions may be selected and/or executed by the autonomous agent 110 for operating independently (of a human operator) and safely within the operating environment.

As mentioned above, the autonomous agent 110 may function to augment and/or fuse data derived by its own onboard sensor suite with the additional observations by the infrastructure devices 120 (e.g., the roadside units) 120 to improve behavioral policy selection by the autonomous agent 110.

Additionally, or alternatively, in various embodiments the infrastructure devices 120 are able to detect and track any type or kind of agents in an operating environment, such as with a video camera or radar. In such embodiments, an example video camera may function to provide detection of agents and semantic classification of the agent type and possible intent of an agent, such as a pedestrian that is about to cross a road, or a car that is about to make a left turn, a driver which is about to open a car door and exit their vehicle, a bicyclist operating in a bike lane, and/or the like.

Additionally, or alternatively, other infrastructure devices 120 may include traffic management devices (e.g., traffic sensors, traffic lights, pedestrian lights, etc.) or the like operating in the environment that may function to communicate with one or more of the roadside units 120 and/or communicate directly with the autonomous agent 110 regarding data collected and/or sensed by the infrastructure device 120, regarding an operating state of the infrastructure device 120 (e.g., red or green traffic light), and the like. For example, in the case that the autonomous agent 110 is an autonomous vehicle, a traffic light may be an infrastructure device 120 in an environment surrounding the autonomous vehicle that may function to communicate directly to the autonomous vehicle or to a roadside unit that may be in operable communication with the autonomous vehicle. In this example, the traffic light may function to share and/or communicate operating state information, such as a light color that the traffic light is projecting, or other information, such as a timing of the light changes by the traffic light, and/or the like.

The communication interface 130 preferably enables the autonomous agent 110 to communicate and/or exchange data with systems, networks, and/or devices external to the autonomous agent 110. Preferably, the communication interface 130 enables one or more infrastructure devices 120 to communicate directly with the autonomous agent 110. The communication interface 130 preferably includes one or more of a cellular system (or any suitable long-range communication system), direct short-wave radio, or any other suitable short-range communication system.

In some embodiments, in addition to a powertrain (or other movement-enabling mechanism), autonomous agent no may include a sensor suite (e.g., computer vision system, LIDAR, RADAR, wheel speed sensors, GPS, cameras, etc.) or onboard sensors that are in operable communication with the onboard computing system 115.

The onboard sensor suite preferably includes sensors used to perform autonomous agent operations (such as autonomous driving) and data capture regarding the circumstances surrounding the autonomous agent no as well as data capture relating to operations of the autonomous agent no but may additionally or alternatively include sensors dedicated to detecting maintenance needs of the autonomous agent 11*o* For example, the sensor suite may include engine diagnostic sensors or an exterior pressure sensor strip. As another example, the sensor suite may include sensors dedicated to identifying maintenance needs related to cleanliness of autonomous agent interiors; for example, internal cameras, ammonia sensors, methane sensors, alcohol vapor sensors, etc.

In accordance with one or more embodiments, an autonomous operating system may generally include a controller 116 controls autonomous operations and/or actions of the autonomous agent 110. That is, suitable software and/or hardware components of controller 116 (e.g., processor and computer-readable storage device) are utilized to generate control signals for controlling the autonomous agent 110 according to a routing goal of the autonomous agent no and selected behavioral policies of the autonomous agent 110.

Additionally, or alternatively, the autonomous agent no includes a sensor fusion system 117, a positioning system 118, and a guidance system 119. As can be appreciated, in various embodiments, the sensors may be organized into any number of systems (e.g., combined, further partitioned, etc.) as the disclosure is not limited to the present examples.

In various embodiments, the sensor fusion system 117 synthesizes and processes sensor data and together with a multi-policy decisioning module or the like predicts the presence, location, classification, and/or path of objects and features of the environment of the autonomous agent no. In various embodiments, the sensor fusion system 117 may function to incorporate data from multiple sensors and/or data sources, including but not limited to cameras, LIDARS, radars, infrastructure devices 120, remote data feeds (Internet-based data feeds), and/or any number of other types of sensors.

The positioning system 118 processes sensor data along with other data to determine a position (e.g., a local position relative to a map, an exact position relative to lane of a road, vehicle heading, velocity, etc.) of the autonomous agent 110 relative to the environment. The guidance system 119 processes sensor data along with other data to determine a path for the vehicle 110 to follow.

In various embodiments, the controller 116 may function to implement machine learning techniques to assist the functionality of the controller 116, such as feature detection/classification, obstruction mitigation, route traversal, mapping, sensor integration, ground-truth determination, and the like.

3. Method for Autonomous Decisioning Using Infrastructure Sensing Data

Figure 2:
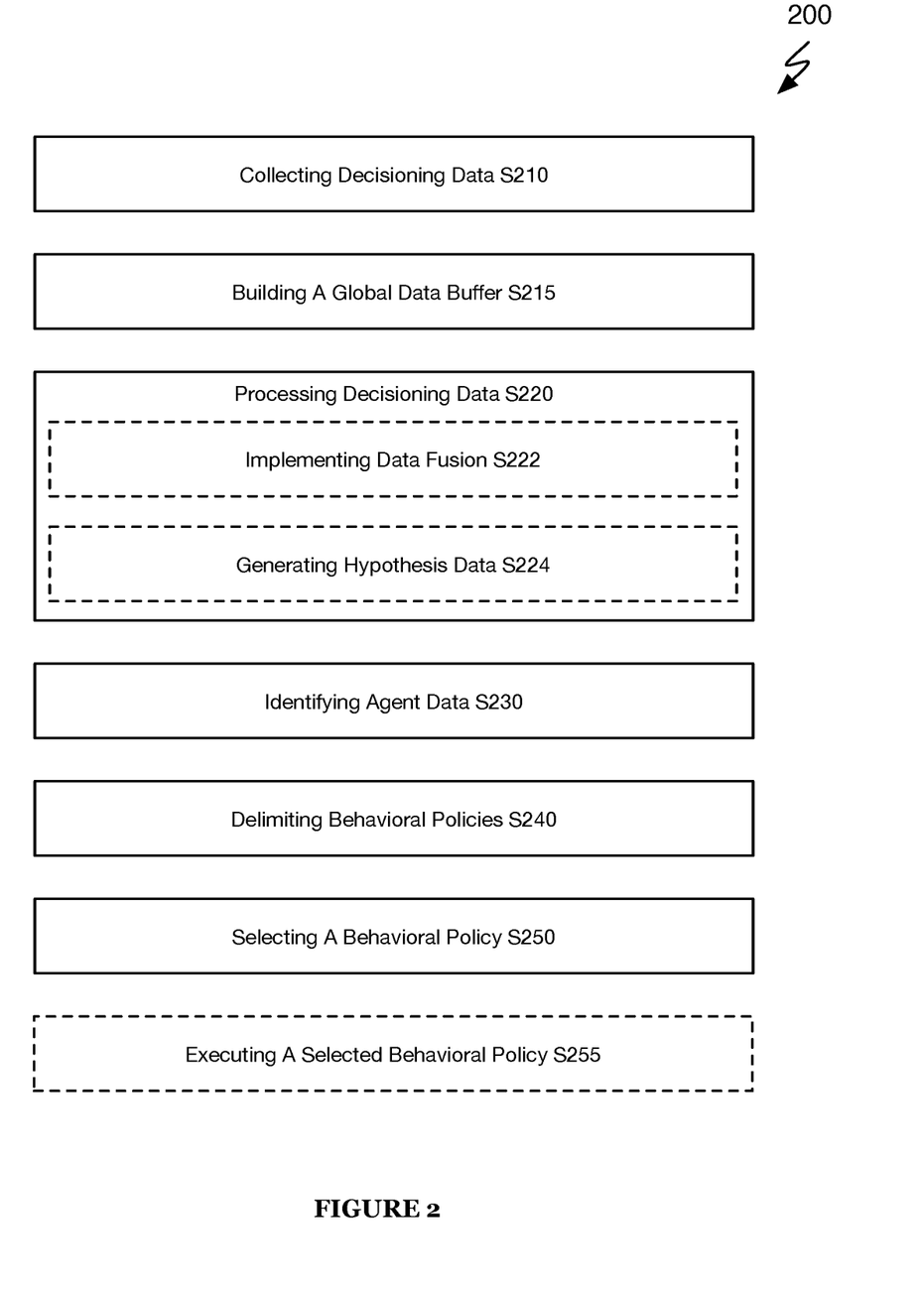
FIG. 2 illustrates an example method in accordance with one or more embodiments of the present application.

As shown in FIG. 2, a method 200 for autonomous decision and control by an autonomous agent including collecting decisioning data S210, building a data buffer comprising decisioning data S215, generate (real-time) current state data S220, generating intent data for each identified agent S230, identifying potential behavioral policies S240, and selecting one of the plurality of behavioral policies S250. The method optionally includes executing the selected behavioral policy S255.

The method 200 preferably functions to enable tractable decision-making for an autonomous agent by limiting a selection of a behavior by the autonomous agent to a limited set of plausible policies. In one or more preferred embodiments, the method 200 enables an autonomous agent to gather circumstance data (including environmental data) from infrastructure devices and infer or predict actions of agents operating in the environment . . . . The observation data provided by the one or more infrastructure devices may preferably enable the autonomous agent to determine likely outcomes of the current environment for different behaviors of the autonomous agent.

S210, which includes collecting decisioning data, functions to collect streams of data from one or more data sources that may be used as input for decisioning by an autonomous agent. Preferably, S210 may function to collect the streams of data at an autonomous agent, such as an autonomous vehicle or the like. In a preferred embodiment, the one or more data sources may include devices and/or system of an autonomous agent, sensors mounted (e.g., onboard sensors) on the autonomous agent, and infrastructure devices in a proximity of the autonomous agent. It shall be noted that while the one or more data sources preferably include devices and/or systems of the autonomous agent, onboard sensors, and infrastructure devices, the one or more data sources may additionally or alternatively include one or more remote data feeds (e.g., weather feed, traffic feed, etc.), a remote autonomous agent platform (e.g., remote servers, cloud servers, etc. for remotely managing and/or operating an autonomous agent), and any other suitable data source accessible to the autonomous agent.

According to one preferred embodiment, S210 may function to collect decisioning data from infrastructure devices. In such preferred embodiment, S210 functions to collect the decisioning data during an operation of the autonomous agent but may also function to collect the decisioning data during periods in which the autonomous agent is not in an active state (e.g., not driving, not in operation, parked or the like). The infrastructure devices preferably include one or more sensor devices that are intelligently arranged and/or positioned within an environment. For instance, the one or more sensor devices may be arranged to collect data that may be assistive for determining and/or generating driving/operating (control) instructions for an autonomous agent and also, for decisioning, by an autonomous agent when presented with multiple driving and/or operating instructions, which instructions to execute and which instructions to disregard. Thus, the one or more infrastructure sensors may function to collect data in a driving environment, which may include road data, sidewalk data, positions of static and/or dynamic object data (e.g., agent data), traffic data, and the like along a given route plan or a possible route plan of a given autonomous agent. In one or more embodiments, the one or more infrastructure devices may function to collect observation data from an external and/or environmental perspective toward the autonomous agent and/or toward a plan route of the autonomous agent.

In some embodiments, the infrastructure devices may include one or more sensor devices that may be fixedly attached or positioned within an (driving) environment, such that a fixed (or substantially) coordinate (geographic) location of the one or more infrastructure sensor devices may be known. Accordingly, such fixedly arranged infrastructure devices may have a fixed field-of-detection. For instance, a camera fixed in a driving environment may have a fixed field-of-view. In some embodiments, the infrastructure devices may include one or more sensors devices that are movably positioned within an environment, such that a coordinate location of the one or more sensor devices varies. In such embodiments, the infrastructure devices may have a variable field-of-detection and may be capable of sensing data along multiple trajectories within an environment.

In a first implementation, S210 may function to automatically collect streams of data from one or more infrastructure devices that are in communication proximity (e.g., a predetermined distance that enables short-range communication) of the autonomous agent. In some embodiments, the infrastructure devices may be configured to communicate with an autonomous agent using short-ranged communication schemes or systems. In such embodiments, once the autonomous agent has entered (or traveled into) a communication range or proximity of a given infrastructure device, the autonomous agent may function to automatically detect signals from the infrastructure device and automatically collect data originating from the infrastructure device.

In a second implementation, S210 may function to automatically collect streams of data from one or more infrastructure devices that are a predetermined distance from an operating autonomous agent. That is, in some embodiments, an operating environment of an autonomous agent may include a plurality of infrastructure devices, however, the autonomous agent may be configured to automatically collect data from only a subset of the plurality of infrastructure device within the predetermined distance of the autonomous agent and possibly, ignore data incoming from other infrastructure devices outside of the predetermined distance of the autonomous agent. In this way, the autonomous agent may function to collect data having a more immediate or higher relative importance for pending and/or immediate operating decisions.

In a variant of the second implementation, S210 may function to automatically collect streams of data from one or more infrastructure devices that are a predetermined distance of the autonomous agent and weigh or consider data collected from the one or more infrastructure devices within an active trajectory or travel path of the autonomous agent differently than data from infrastructure devices that are not or no longer within a trajectory or travel path of the autonomous agent. That is, in some embodiments, S210 may function to weigh data from infrastructure devices that are substantially coincident with a position of the autonomous agent and ahead of a travel path of the autonomous agent with additional (increased) weight than a weight afforded to data from infrastructure devices behind or that has been passed by the autonomous agent along its travel path.

In some embodiments, the data collected from the one or more infrastructure devices may include compressed and/or semantically dense data regarding one or more features of an environment. In some embodiments, the field-of-detection of given infrastructure device comprises a geometrically defined region and within the geometrically defined region, the infrastructure device may be configured to sense or collect a semantic abstraction (e.g., a general shape or size, positions, velocity (moving or not moving) of the features, objects, and/or agents within the geometrically defined region.

Additionally, or alternatively, in some embodiments, the one or more infrastructure devices may be configured to sense or detect data within the geometrically defined region and derive and/or compute a state data about the circumstances within the geometrically defined shape. For instance, if the geometrically-defined shape or sensing region is a square that includes a sidewalk or similar pedestrian path, a first infrastructure sensor device may function to identify whether there are static (objects or persons that are not moving) and/or dynamic agents (objects or persons that are moving) on the sidewalk and provide as state data to the autonomous agent an indication confirming static agents or dynamic agents positioned on the sidewalk (e.g., coordinate data of the static or dynamic agents or the like operating within a geographic location). In some cases, if there are no agents positioned within the geometrically-defined sensing region, the state data may be an indication of no agents (e.g., "Clear"). Thus, in such embodiments, rather than sending a full representation of a scene within the geometrically-defined shape or sensing region, the infrastructure device may provide semantically dense state data to an autonomous agent. As a few examples of state data, the infrastructure sensing devices may indicate Agent or No Agent, Static Agent or Dynamic Agent, Clear or Not Clear, Busy (Active) or Not Busy (Not Active), and/or any suitable simplified and/or derivative information about circumstances within a sensing region of an infrastructure device that may be provided to an autonomous agent.

S215, which includes building a data buffer comprising decisioning data, may function to arrange and/or store streams of data from one or more data sources within a data buffer, which may sometimes be referred to herein as a historical and/or global data buffer. The data buffer preferably functions to store historical data as well as presently collected data (e.g., real-time data or near real-time). In some embodiments, S215 may function to collect data from devices and/or components of the autonomous agent, onboard sensors of the autonomous agent, and/or data from one or more infrastructure devices. Thus, in a preferred embodiment, the buffer may be considered a global data buffer or the like that functions to collect data from the various sensing devices onboard an autonomous agent as well as sensing data from infrastructure devices not onboard the autonomous agent, which may additionally include data from other remote data sources (e.g., Internet-based data feeds) or the like.

S215 may function to build the data buffer by sequentially storing data received (in S210) within the data buffer based on a time at which the data was received or collected by an autonomous agent. However, as timestamp data that may be appended with the one or more streams of data collected by an autonomous agent may be analyzed, S215, may function to continuously and/or periodically reconfigure the data buffer using a global time synchronization technique in which the data elements within the data buffer are adjusted and/or re-ordered according to the timestamp data associated with each of the one or more streams of data.

Accordingly, the data buffer may function to operate in dual states in which a first portion of data comprising historical data stored in the data buffer may be globally time synchronized and a second portion of data comprising recently (within 0 to 15 seconds) stored data and/or real-time data may be data that is not yet globally time synchronized. It shall be noted that recently stored data may be considered data that has not been stored beyond a predetermined threshold of time and/or data that has been stored but not yet globally time synchronized with the previously stored data within the data buffer.

In a preferred implementation, S215 implements a global time synchronization module that takes into account latencies in the communication and/or collection of the one or more streams of data and functions to synchronize the one or more streams of data collected from all data sources. In some embodiments, a latency of a data source may be known based on a communication method and/or global position system (GPS) based position of the data source relative to an autonomous agent at the time of receipt of the stream of data (alternatively, at the time of transmitting the stream of data). With respect to infrastructure devices, because the infrastructure devices are positioned away from an autonomous agent in the circumstances and/or environment surrounding the autonomous agent, the data collected, sensed, and/or derived by the infrastructure devices are generally communicated to an autonomous agent over using some wireless communication system (e.g., short-wave communication) or the like. Accordingly, regarding each infrastructure device that communicates data to an autonomous agent, S215 may function to calculate or estimate a latency value in communication between each respective infrastructure device and the autonomous agent. S215 may function to use the estimated or calculated latency value to adjust an actual event time and/or receipt time for the data stream associated with each infrastructure device that communicates data to an autonomous agent. For instance, each data stream may be appended with metadata (e.g., a timestamp) identifying a time of receipt by the autonomous agent and S215 may function to reduce or subtract from the time of receipt for each stream of data the latency value according to the stream of data's data source (e.g., infrastructure device). That is, a latency value may be computed based on a timestamp provided the infrastructure device indicating a time at which the data was sensed, obtained, and/or originated by the infrastructure device. S215 may function to compute the latency value based on a difference between the timestamp data and a second timestamp by the autonomous agent indicating a time at which the data from the infrastructure data was received.

In one variation of S215, a latency value is predetermined or known in advance (rather than calculated or estimated by the autonomous agent) for each type of infrastructure device and the predetermined and/or known latency value for each type of infrastructure device may be reduced or deducted from a time of receipt of each stream of data to determine the globally synchronized time for the stream of data associated with a given infrastructure device.

In a second implementation, S215 may function to globally time synchronize the multiple streams of data generated by each of the data sources, including infrastructure devices based on timestamp data. That is, in this second implementation, each of the data sources may function to operate on a common clock or a same synchronized clock with the autonomous agent. Accordingly, at a time of recording and/or sensing data, each of the data sources, such as one of the infrastructure devices, may function to record a timestamp based on the common clock or the synchronized clock indicating a synchronized time at which data within the data streams was actually observed by the onboard sensors and the offboard infrastructure devices rather than a time at which the data streams from each of the onboard sensors and the offboard infrastructure devices were received or collected by the autonomous agent. S215 may function to adjust a serial order of the data streams received from the one or more data sources using the timestamp data in the placed of a timestamp associated with a receipt of the streams of data at an autonomous agent.

S215, according to one or more of the above-described global time synchronization schemes, preferably functions to re-order and/or rearrange a sequential order of the one or more data streams within the global data buffer. In such embodiments, S215 preferably functions to re-order and/or rearrange data elements of the data streams from the data sources from a first (or initial) position within the global data buffer to a second (or subsequent) position within the global data buffer based on a global synchronized time for each of the data elements. Thus, S215 may function to interject or reposition data elements from streams of data originating with the one or more infrastructure devices into a time synchronized position in the global data buffer to increase an accuracy of the decisioning data to the autonomous agent.

S220, which includes processing the collected decisioning data, may function to perform one or more data processing techniques against the decisioning data to derive decisioning inputs for selecting behavioral policy by the autonomous agent. In one embodiment, S220 includes implementing one or more data fusion techniques (S222) and generating one or more hypothesis regarding a (current or present) state of one or more agents within an environment of the autonomous agent (S224).

Agent Tracking

S221, which includes tracking one or more agents and/or objects, may function to track one or more agents and/or objects that may be identified by the autonomous agent and/or infrastructure devices. In one or more embodiments, S221 may function to identify one or more agents and/or objects in circumstances surrounding one or more of the autonomous agent and the infrastructure devices based on the collected decisioning data. In such embodiments, the collected decisioning data may include sensor data from one or more of the autonomous agent and the infrastructures devices. Accordingly, the one or more agents being tracked may include agents identified based on the sensor data of the autonomous agent and/or sensor data obtained by the infrastructure devices.

In some embodiments, S221 may function to track the one or more agents via one or more of the autonomous agent, infrastructure devices, and/or a remote autonomous agent service (e.g., a cloud-based server (a distributed computing network or the like)). That is, in some embodiments, each of the autonomous agent, infrastructure devices, and/or the autonomous agent service may function to perform a tracking functionality of agents identified in circumstances surrounding the autonomous agent and/or the infrastructure devices. Thus, it shall be noted that, a tracking functionality described herein may be performed by or at any of the autonomous agent, the infrastructure devices, and the autonomous agent service. In some embodiments in which the tracking functionality of an agent and/or an object is performed remote from the autonomous agent, possibly at the infrastructure devices and/or the remote autonomous agent service, the resultant tracking data may be transmitted to the autonomous agent from the tracking source.

In a preferred embodiment, S221 may function to identify and/or insert a dedicated track (i.e., a tracklet) for sensor data obtained from each respective sensor of the autonomous agent and/or the infrastructure devices. That is, in such embodiments, S221 may insert sensor data from each distinct sensor of the autonomous agent and/or the infrastructures devices into a dedicated memory section and/or independent memory sections of the decisioning data buffer and/or similar data buffer. In this way, S221 may function to track agents of each distinct sensor independently.

Additionally, or alternatively, in some embodiments, S221 may function to merge the distinct tracklets for each sensor (e.g., sensor tracklet) into a master tracker. The master tracker, in some embodiments, may include a convergence of all decisioning data and/or sensor data from which one or more hypothesis regarding a tracking and/or estimated trajectory of one or more agents may be computed. The convergence of the distinct tracklets into the master tracker may enable S221 to build a composite of fused tracking from multiple perspectives of each distinct agent and/or object that is identified in the sensor data. That is, if two or more distinct sensors having an overlapping detection and/or tracking of a subject agent, the sensor data (i.e., perspectives) of the two or more distinct sensors may be combined to build a composite or comprehensive tracking of the subject agent. For instance, a first camera of the autonomous agent may function to sense and track a subject agent (e.g., a pedestrian) and second camera of an infrastructure device may function to sense and track the subject agent from a distinct perspective. In such instance, S221 may function to combine the video data of the first and second camera to build a composite tracking of the subject agent. In some embodiments, the composite tracking of a subject agent and/or object may be used as input for estimating a trajectory and/or an estimated behavioral policy for the subject agent.

Agent Classification

S222, which includes identifying one or more agents and/or objects, may function to classify each of the one or more agents and/or objects detected within the circumstances surrounding the autonomous agent. In a preferred embodiment, S222 may function to classify and/or categorize each identified agent and/or object within circumstances surrounding one or more of the autonomous agent and/or the infrastructure device.

In some embodiments, S222 may function to function to perform feature extraction of an agent or an object identified based on sensor data and perform a classification of the agent and/or the object based on a feature extraction dataset. In such embodiments, S222 may function to implement any suitable feature extractor include a deep machine learning model or the like. It shall be noted that S222 may function to implement any suitable object and/or agent classification technique, classification algorithm (e.g., trained machine learning-based classification algorithms, classification models, etc.), statistical classification models, and/or the like for purposes of classifying an agent and/or an object.

Fusion

S223, which includes implementing one or more data fusion techniques, functions to collect or aggregate streams of data from the onboard and/or offboard sensors or data sources and provide the data to a fusion system or fusion module to generate one or more estimations and/or classifications regarding the autonomous agent and the features (e.g., agents, objects, areas, etc.) in an operating environment of the autonomous agent.

In a first implementation, S223 may function to provide as input into a data fusion system the onboard sensor data separately from the offboard sensor data. That is, in this first implementation, sensor data collected from some or all of the onboard data sources of an autonomous agent may be aggregated and synthesized using the fusion system of the autonomous vehicle independently from a synthesis of the offboard sensor data or the like. A proximity of onboard data sources to the fusion system of the autonomous agent may enable an efficient passing of onboard sensor data from the onboard data sources to a processing system of the fusion system whereas a latency associated with sensor data exchanged between the autonomous agent and the one or more infrastructure devices and/or remote data sources includes a timing offset or timing misalignment that limits an ability of the fusion system to process the onboard and offboard sensor data together.

Additionally, and/or alternatively, in this first implementation, the onboard sensor data and the offboard sensor data may be provided as input into a common fusion system or module. Additionally, or alternatively, S223 may provide the onboard sensor data as input into a first fusion system and the offboard sensor data as input into a second fusion system. In such embodiment, the first fusion system may be specifically configured to process onboard sensor data and the second fusion system may be specifically configured to process offboard sensor data.

In a second implementation, S223 may function to process the onboard sensor data and the offboard sensor data together (e.g., at the same time or substantially the same time) using a common fusion system. That is, in this second implementation, it may be possible to pre-process the onboard sensor data and the offboard sensor data to time synchronize the data streams originating from the onboard data sources and the offboard data sources to reduce or eliminate discrepancies in synchronization resulting from communication latencies between the autonomous agent and the one or more offboard infrastructure devices and/or one or more offboard data sources (e.g., cloud-based or Internet-based data feeds, communications from other autonomous agents (vehicle-to-vehicle communications), and/or the like). Accordingly, the disparate data streams from the onboard data sources (sensors) and the disparate data streams from the offboard data sources (infrastructure devices, distinct autonomous agents, and the like) may be combined into a unified (or single) data stream and provided into the fusion system for processing.

Hypotheses/Intent Estimation

S224, which includes generating one or more hypotheses regarding a (current or present) state of one or more agents within an environment of the autonomous agent and one or more hypotheses regarding a state of the autonomous agent, may function to output from the fusion system and/or associated data processing module a hypothesis for each of the autonomous agent and identified agents external to the autonomous agent. Preferably, the hypothesis for each external (environmental agent) and autonomous agent includes an estimation of a geographic position (or three-dimensional coordinate or the like), a velocity, and/or acceleration. Additionally, or alternatively, the hypothesis for external agents may include shape estimations or descriptions and/or classifications having probabilistic values with variances and covariances. The classification outputs preferably includes a classification of whether an identified agent within a scene or operating environment of the autonomous agent is static or dynamic and the type or class of agent (e.g., a person, a vehicle, a bicyclist, an animal, a stationary object, etc.). The fusion system may function to implement one or more and/or a combination of state estimation and/or classification algorithms and models including simple gaussian functions, predictive or inferential machine learning models, machine learning classifiers, and the like.

S230, generating an inference and/or identifying an intent of each of the agents in circumstances surrounding the autonomous agent and/or surrounding the infrastructure devices, may function to receive as input one or more of the hypotheses generated in S224 to generate one or more potential intents for agents in the circumstances as well as an intent estimation for the autonomous agent. An intent of an agent preferably relates to an estimation of a behavioral policy (i.e., an estimation of what an agent is expected to do, one or more expected or future actions, or the like) having a highest probability of being executed by a given agent. The intent for each agent is preferably estimated using a multi-policy decision-making module that functions to estimate behavioral policy for each agent based on generated hypotheses data (derived in S220/S224) and data from the global data buffer (e.g., historical data buffer) preferably in a globally time synchronized state.

It shall be noted that intent estimation may preferably be performed onboard an autonomous agent, intent estimation may be performed by any and/or a combination of the autonomous agent, an infrastructure device, a remote autonomous agent service and/or the like. In one example indirect intent estimation (e.g., intent estimation by an agent other than a subject autonomous agent), sensor data may be collected at an infrastructure device and transmitted to a remote autonomous agent service implemented via a cloud service or the like. The remote autonomous agent service may function to compute intent estimations for each of the agents identified by the infrastructure device. Additionally, or alternatively, the infrastructure, itself, may function to compute intent estimations based on sensor data or the like obtained by the infrastructure device.

In a preferred embodiment, S230 may function to identify agents operating in the environment and a static or dynamic classification of each agent. In such embodiments, S230 may function to selectively provide as input into the multi-policy decision-making module only those agents identified or classified as being dynamic (moving or active) agents in the operating environment of the autonomous agent thereby limiting intent computations by the multi-policy decision-making module to the dynamic agents. A technical benefit of the selective input of dynamic agents into the multi-policy decision-making module is that this technique may function to preserve (the limited) computational resources of the autonomous agent, which enables the autonomous agent to compute with higher efficiencies and speed intents of actors or agents in the environment having the highest impact on behavioral policy selection by the autonomous vehicle.

Preferably, the multi-policy decision-making module includes a simulator or similar machine or system that functions to estimate future (i.e., steps forward in time) behavioral policies (operations or actions) for each of the agents identified in an operating environment of the autonomous agent including potential behavioral policies that may be executed by the autonomous agent, as described in U.S. patent application Ser. No. 14/814,766, which is incorporated in its entirety by this reference. The simulations may be based on a current state of each agent (e.g., the current hypotheses) and historical actions or historical behaviors of each of the agents derived from the historical data buffer (preferably including data up to a present moment). The simulations may provide data relating to interactions (e.g., relative positions, relative velocities, relative accelerations, etc.) between projected behavioral policies of each agent and the one or more potential behavioral policies that may be executed by the autonomous agent.

Policy Enumeration

Figure 3:
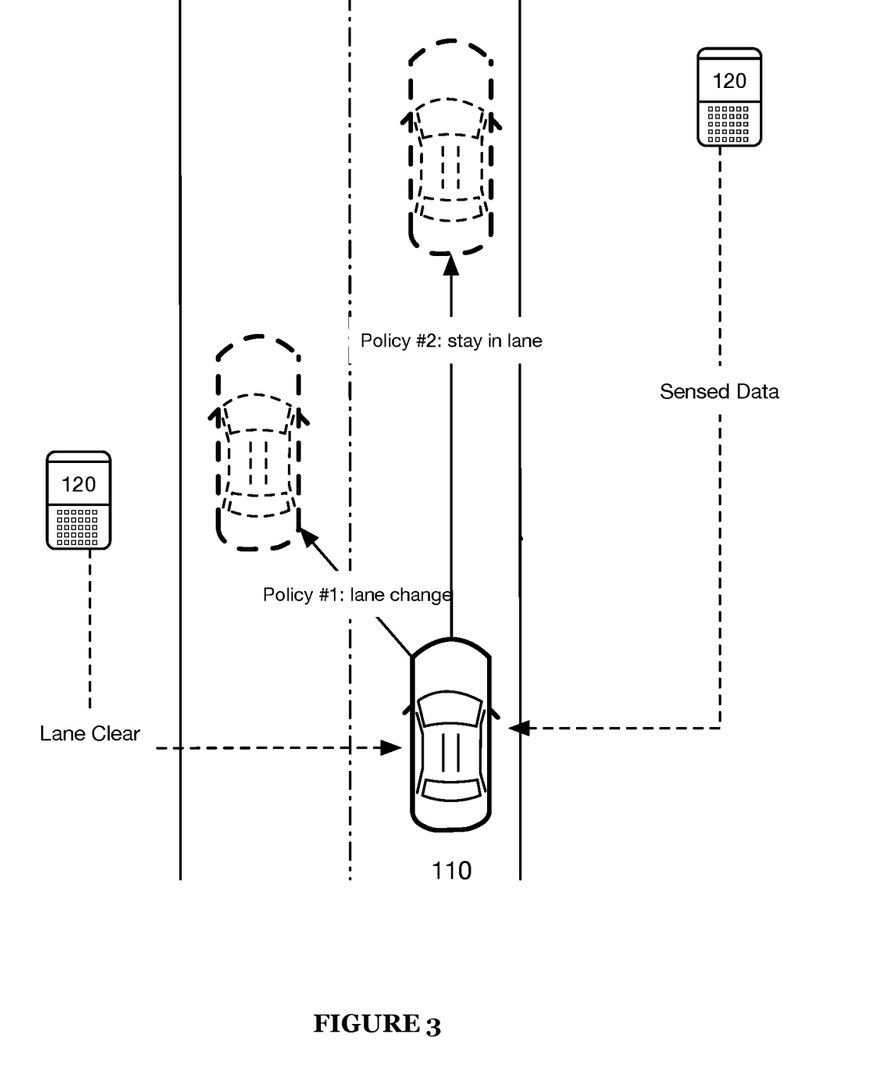
FIG. 3 illustrates an example schematic with prospective behavioral policies for an autonomous agent in accordance with one or more embodiments of the present application.

Based on the forward simulations by the multi-policy decision-making module, S240, which includes enumerating identifying potential behavioral policies for execution by the autonomous agent, preferably functions to output a plurality of potential behavioral policies having highest probabilities of being executed by the autonomous agent, as shown by way of example in FIG. 3. In some embodiments, S240 may function to output potential behavioral policies that may be most safely executed by the autonomous agent. In one embodiment, S240 may function to output potential behavioral policies that optimizes over a plurality of operating factors including safety and efficiency of operating the autonomous agent, which may include limiting a disturbance of the autonomous agent within the operating environment.

It shall be noted that the universe of behavioral policies and/or available behavioral policies that may be considered by the multi-policy decision-making module may be based on a plurality of distinct behavioral policy sources including, but not limited to, a remote operator of the autonomous agent or a remote autonomous agent service, a predetermined set of policies, a geographical map or route mapping augmented with select behavioral policies available for execution along distinct geographic locations within the geographical map or route mapping, user/passenger preferences, and the like. Accordingly, any suitable behavioral policy source may function to populate a behavioral policy database that may include all possible behavioral policies for a given autonomous agent.

Additionally, or alternatively, S240 may function to delimit the potential behavioral policies for execution by the autonomous agent based on one or more predetermined thresholds relating to probabilities of execution by the autonomous agent. That is, in some embodiments, S230 may function to generate hundreds and if not, thousands of simulations resulting in hundreds or thousands of potential behavioral policies for execution by the autonomous agent in a given circumstance. Therefore, S240 may function to identify only a subset of those generated behavioral policies according to predetermined threshold identifying one or more minimum probability values for safely executing an action or an operation by the autonomous agent or one or more minimum probabilities value for successfully executing an operation or an action by the autonomous agent in a given circumstance or real-time scenario.

S250, which includes selecting one of the plurality of behavioral policies, functions to select one of the potential behavioral policies based on one or more predetermined or dynamic selection criteria. The selection criteria may be based on any suitable behavioral policy selection factors that may be delineated in advance of operating the autonomous agent or dynamically based on one or more features relating to an operating environment or operating mode of the autonomous agent. For instance, the selection criteria may be predetermined and/or set such that the autonomous agent functions to select the behavioral policy with a highest probability of being executed safely. In another example, if an operating circumstance of the autonomous vehicle includes an emergency situation, the selection criteria may be dynamic and set such that the autonomous agent functions to select a behavioral policy from the tractable set of behavioral policies that requires a (weighted) balance between efficiency in operation and safety or the like.

In some embodiments, the set of behavioral policies available for selection by the autonomous agent may be further delimited based on data collected from the one or more infrastructure devices. For instance, in some embodiments, semantic classification or other classification data relating to one or more features of the environment may additionally be used as input in selecting an optimal behavioral policy in S250. Accordingly, for each behavioral policy of the delimited set of behavioral policies available for selection by the autonomous agent, S250 may function to data from one or more of the infrastructure device that may function to validate or invalidate operations that may be performed or actions that may be taken by the autonomous agent according to a given behavioral policy. For instance, S250 may function to identify semantic data from an infrastructure device, such as a camera or a radar installed in the environment, indicating that a sidewalk in a potential turning direction of the autonomous agent is "clear" (i.e., no active or dynamic agents on sidewalk). This example semantic data may provide a negative observation (e.g., a lack of agents in an observable area or the like) inference within a sensing region or within an observable scene that validates or confirms that a turn by the autonomous agent can be safely performed in a given circumstance. Correspondingly, semantic data from one or more infrastructure devices may provide positive observation data, such as multiple active agents on a sidewalk in a possible turning direction of autonomous agent, may invalidate several behavioral policy that requires a turn in the direction of the sidewalk. Thus, semantic data and/or other relevant infrastructure sensor data may be re-applied at the behavioral policy decisioning or selection step to further delimit and/or inform a most optimal selection of a behavioral policy by the autonomous agent.

Figure 4:
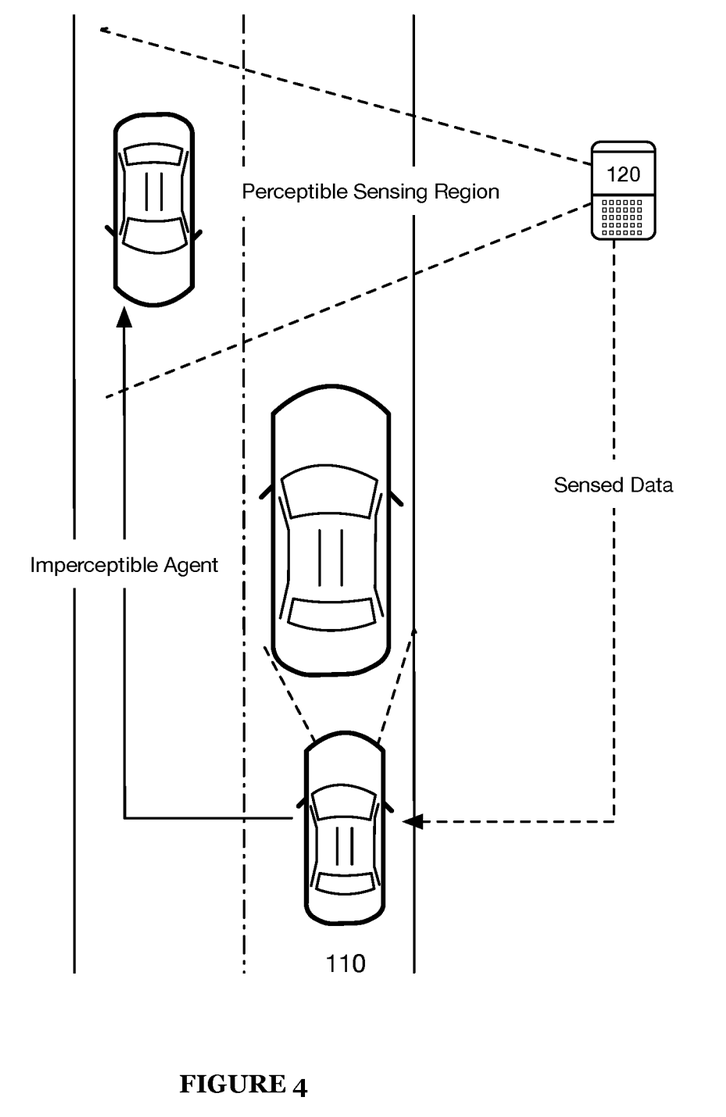
FIG. 4 illustrates an example schematic implementing informative infrastructure data for behavioral policy selection by an autonomous agent in accordance with one or more embodiments of the present application.

Additionally, or preferably, S250 may function to identify infrastructure sensing data that relates to one or more imperceptible regions of an operating environment of an autonomous agent and use the imperceptible offboard sensing data to inform a selection of behavioral policy by the autonomous agent. For example, if an autonomous agent (e.g., autonomous vehicle) is positioned behind a stationary object, such as a large bus, on a single lane street, S250 may function to identify that the autonomous agent cannot perceive whether there is oncoming traffic in an adjacent lane with opposing traffic, as shown by way of example in FIG. 4. In such example, S250 may function to identify infrastructure sensing data within the sensing regions that are imperceptible to the autonomous agent that may inform whether a behavioral policy for traversing into the adjacent lane for opposing traffic may be performed safely by the autonomous agent for traveling past the large bus to achieve a routing goal, etc.

In response to selecting a behavioral policy, S255, which includes executing a selected behavioral policy, may function to automatically execute the selected behavioral policy, as prescribed, by the autonomous agent. Accordingly, the autonomous agent may be controlled and/or operated based on an execution by an onboard computer or the like of instructions associated with the selected behavioral policy.

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A system for operation of an autonomous agent, the system comprising:
    a sensor system onboard the autonomous agent, wherein the sensor system is configured to generate a first data stream;
    a remote infrastructure device configured to generate a second data stream;
    a communication interface of the autonomous agent communicatively coupled to the remote infrastructure device;
    a computing system distributed between at least the autonomous agent and the remote infrastructure device, wherein the computing system is configured to repeatedly:
        calculate a probability value for each of a plurality of predetermined candidate behavioral policies using the first and second data streams;
        select a behavioral policy from the plurality of predetermined candidate behavioral policies, based on a set of criteria comprising selecting a behavioral policy having the highest probability value from the plurality of predetermined candidate behavioral policies; and
        autonomously control the autonomous agent according to the behavioral policy.

2. The system of claim 1, wherein the computing system is configured to buffer at least one of the first and second data streams.

3. The system of claim 1, wherein the computing system is further configured to:
    track a set of agents in an environment of the autonomous agent based on the first and second data streams; and
    estimate an intent of each agent of the set, wherein the behavioral policy is selected based on the estimated intent of at least one agent of the set.

4. The system of claim 3, wherein each agent of the set is tracked within a predetermined region based on the second data stream.

5. The system of claim 1, wherein the computing system further comprises a second remote infrastructure device.

6. A method comprising:
    determining a first stream of observation data at an autonomous agent;
    determining a second stream of observation data with a remote device arranged offboard the autonomous agent and communicatively coupled to the autonomous agent; and
    repeatedly:
        calculating a probability value for each of a plurality of predetermined candidate behavioral policies using the first and second streams of observation data;
        selecting a behavioral policy from the plurality of predetermined candidate behavioral policies, based on a set of criteria comprising selecting a behavioral policy having the highest probability value from the plurality of predetermined candidate behavioral policies; and
        autonomously controlling the autonomous agent according to the behavioral policy.

7. The method of claim 6, wherein the behavioral policy is selected using a distributed computing system comprising a node offboard the autonomous agent.

8. The method of claim 7, wherein the node is located at the remote device.

9. The method of claim 6, wherein the behavioral policy is selected using a computing system, wherein the method further comprises: buffering at least one of the first and second streams of observation data at the computing system.

10. The method of claim 9, wherein the computing system comprises a node onboard the autonomous agent.

11. The method of claim 6, wherein determining the second stream of observation data comprises receiving the second stream of observation data at a computing system of the autonomous agent.

12. The method of claim 11, wherein the second stream of observation data is received based on the autonomous agent being within a communication proximity of the remote device.

13. The method of claim 6, wherein the first and second streams of observation data cooperatively define an overlapping field of sensing.

14. The method of claim 6, wherein the second stream of observation data is associated with a predetermined region of sensing.

15. The method of claim 6, wherein the second stream of observation data comprises abstractions of objects located within a predetermined region of sensing.

16. The method of claim 15, wherein the abstractions of objects comprise a dynamic object data.

17. The method of claim 6, wherein the first stream of observation data is determined using a sensor suite of the autonomous agent, wherein the remote device comprises: a sensor and a processor configured to generate the second stream of observation data based on measurements collected by the sensor.

18. The method of claim 6, further comprising:
tracking a set of agents in an environment of the autonomous agent based on the first and second streams of data; and
determining an intent estimation for each agent of the set, wherein the behavioral policy is selected based on the intent estimation of at least one agent of the set.

* * * * *